(12) United States Patent
Yasumoto et al.

(10) Patent No.: US 7,907,845 B2
(45) Date of Patent: Mar. 15, 2011

(54) OPTICAL SPACE TRANSMISSION MODULE

(75) Inventors: Hideo Yasumoto, Osaka (JP); Hiroyuki Sasai, Osaka (JP)

(73) Assignee: Panasonic Corporation, Osaka (JP)

( * ) Notice: Subject to any disclaimer, the term of this patent is extended or adjusted under 35 U.S.C. 154(b) by 790 days.

(21) Appl. No.: 11/976,535

(22) Filed: Oct. 25, 2007

(65) Prior Publication Data
US 2008/0252981 A1 Oct. 16, 2008

(30) Foreign Application Priority Data
Oct. 31, 2006 (JP) .................................. 2006-296641

(51) Int. Cl.
*H04B 10/10* (2006.01)
(52) U.S. Cl. ........................ 398/135; 398/128
(58) Field of Classification Search .......... 398/135–139, 398/120, 201
See application file for complete search history.

(56) References Cited

U.S. PATENT DOCUMENTS

| | | | | |
|---|---|---|---|---|
| 3,371,212 A | * | 2/1968 | Morris Weiss | 250/347 |
| 5,517,016 A | * | 5/1996 | Lesh et al. | 250/201.1 |
| 5,777,768 A | * | 7/1998 | Korevaar | 398/129 |
| 5,790,291 A | * | 8/1998 | Britz | 398/129 |
| 2002/0030873 A1 | * | 3/2002 | Paoli | 359/152 |

FOREIGN PATENT DOCUMENTS

| | | |
|---|---|---|
| JP | 2002-289978 | 10/2002 |
| JP | 2004-165957 | 6/2004 |

* cited by examiner

*Primary Examiner* — Leslie Pascal
(74) *Attorney, Agent, or Firm* — Wenderoth, Lind & Ponack, L.L.P.

(57) ABSTRACT

An optical space transmission module reduces an upper limit of light output based on a safety standard of a laser, reduces light returned to a laser, and is made smaller in size. The optical space transmission module includes a light emitting section which outputs a transmission light, a base section including a reflection section which reflects the transmission light, and a reflection type diffusion section which reflects and converts into a diffused light the reflected light which has been reflected by the reflection section. The reflection section has a function to increase a beam diameter of the transmission light after reflection.

10 Claims, 10 Drawing Sheets

OPTICAL SPACE TRANSMISSION MODULE

BACKGROUND OF THE INVENTION

1. Field of the Invention

The present invention relates to an optical space transmission module for transmitting an optical signal through an external space as a medium.

2. Description of the Background Art

As a speed-up mode of wireless transmission, an optical space transmission technique has recently been attracting attention. This technique uses light waves instead of radio waves. Light waves provide high security because of their nature of straight travel and light blocking, in addition to high-speed performance using their natural wide band. As a light source used in the optical space transmission, a light emitting diode (LED) or a semiconductor laser diode (LD) is used. The LD, which enables high-speed modulation, is more advantageous for improving transmission speed.

Figure 10:
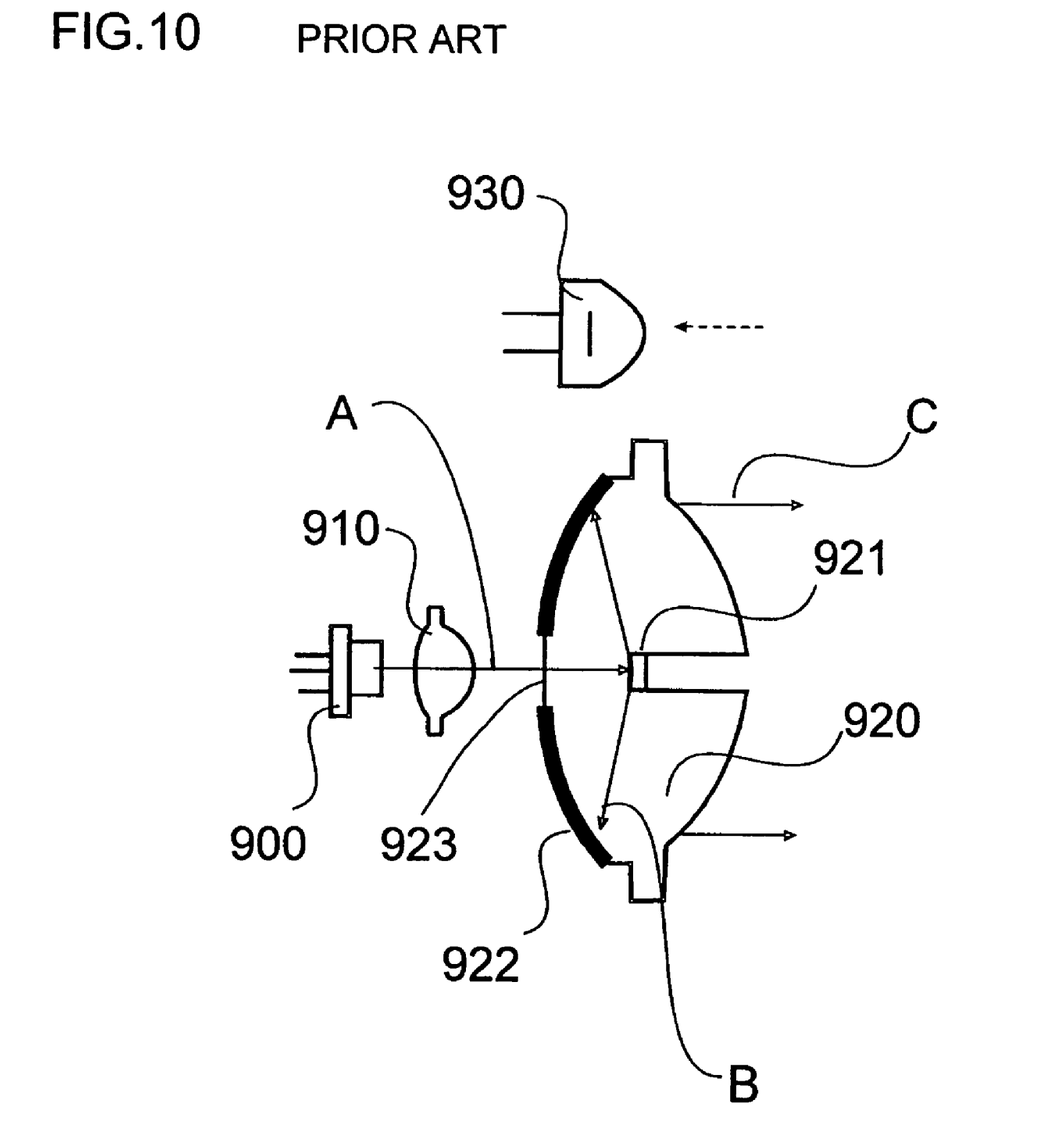
FIG. 10 is a view showing an exemplary configuration of a conventional optical transmitter.

The LD, however, has a light source size which is smaller than that of the LED, and its output light has higher coherency. Thus, when the output light of the LD is emitted directly to an external space and accidentally gets into an eye, an image with high energy density is projected on a retina, and there is a danger that the retina is damaged. In order to obtain with the LD a safety level equivalent to that of the LED, light output intensity has to be lowered, or the size of a virtual secondary light source has to be enlarged with the coherency of the output light lowered using an optical component such as a diffuser panel or the like. In the latter case, the size of the image projected on the retina depends on the secondary light source size. For obtaining larger light output with safety of an optical transmitter maintained, the above secondary light source size may be enlarged. As such, an optical system which maintains safety of a laser, for example, there is an optical transmitter which is disclosed in Japanese Laid-Open Patent Publication No. 2004-165957 (hereinafter, referred to as Patent Document 1). FIG. 10 is a view showing an exemplary configuration of the conventional optical transmitter disclosed in the Patent Document 1.

As shown in FIG. 10, the conventional optical transmitter comprises a laser 900, a condenser lens 910, a lens 920, a reflection type diffusion section 921, a reflection section 922, an opening section 923, and a light receiving section 930. The condenser lens 910 converges a laser beam A outputted from the laser 900, and emits the converged laser beam A to the reflection type diffusion section 921 through the opening section 923. The reflection type diffusion section 921 reflects and converts the emitted laser beam A into diffused light B. The reflection section 922 reflects the diffused light B. The lens 920 distributes the diffused light B reflected by the reflection section 922 in one direction, and outputs the distributed light as a transmission signal C. The light receiving section 930 receives a signal beam outputted from an optical transmitter facing thereto. In the conventional optical transmitter, the coherency of the laser beam A is disturbed by the reflection type diffusion section 921, and a virtual secondary light source having a Lambertian distribution is formed on the reflection type diffusion section 921. Therefore, safety is enhanced more than the case of using a laser alone.

In the conventional optical transmitter, however, the laser beam A is emitted directly to the reflection type diffusion section 921. Thus, the reflected diffused light B is partially returned to the laser 900, and this may cause the laser 900 to operate unstably. In addition, since the conventional optical transmitter uses a reflection mechanism, its thickness can be reduced but the diameter of the reflection section 922 is large. This increases the entire occupying area of the optical transmitter including the light receiving section 930.

SUMMARY OF THE INVENTION

Therefore, an object of the present invention is to provide an optical space transmission module, for solving the above conventional problems, which reduces an upper limit of light output based on the safety standard of the laser, reduces light returned to a laser, and is made smaller in size.

The present invention is directed to an optical space transmission module for transmitting an optical signal through an external space as a medium. In a first aspect, the optical space transmission module comprises a light emitting section operable to output a transmission light; a base section including a reflection section operable to reflect the transmission light; and a reflection type diffusion section operable to reflect and convert into a diffused light the transmission light which has been reflected by the reflection section. The reflection section has a function to increase a beam diameter of the transmission light after reflection.

According to the first aspect, the transmission light is converted into the diffused light after the beam diameter thereof is increased by the reflection section, thereby forming a larger-diameter secondary light source. This can reduce an upper limit of light output based on the safety standard of the laser.

In a second aspect, the reflection section is a convex mirror.

According to the second aspect, the transmission light which has been reflected by the reflection section is prevented from being returned to the light emitting section by setting an inclination angle of the convex cross section of the reflection section at a certain value or higher.

In a third aspect, the reflection section is made up of a Fresnel mirror having the same function as a convex mirror.

According to the third aspect, the reflection section is made thinner in thickness by using the Fresnel mirror.

In a fourth aspect, the reflection type diffusion section has a concave shape.

According to the fourth aspect, a directivity angle of the diffused light outputted from the optical space transmission module is adjusted by controlling an inclination angle and a curvature of the cross section of the reflection type diffusion section, thereby effectively transmitting a transmission light.

In a fifth aspect, the optical space transmission module further comprises a light receiving section operable to receive an optical signal. The light receiving section is provided on a surface of the base section different from the reflection section.

According to the fifth aspect, the provision of the light receiving section on the surface of the base section different from the reflection section allows the light receiving section to be integrated into a transmitter, thereby making a receiver-transmitter smaller in size.

In a sixth aspect, the optical space transmission module further comprises a lens section which is provided so as to cover the reflection type diffusion section.

According to the sixth aspect, the diffused light is converged by the lens section to control the directivity angle of the diffused light, thereby effectively transmitting a transmission light.

In a seventh aspect, the lens section includes a plurality of lens regions, and the plurality of lens regions includes at least a first lens region operable to distribute the diffused light and a second lens region operable to converge the optical signal into the light receiving section.

According to the seventh aspect, the first lens region and the second lens region are separated, and convergence characteristics are optimized at each region, thereby more effectively converging the optical signal into the light receiving section.

In an eighth aspect, the lens section is made up of a Fresnel lens.

According to the eighth aspect, an optical system is made thinner in thickness.

In a ninth aspect, the reflection section is located between the light emitting section and the light receiving section, and the reflection section, the light emitting section and the light receiving section are aligned substantially along a straight line.

According to the ninth aspect, the light which has been reflected by the reflection section after outputted from the light-emitting section is prevented from being connected directly to the light receiving section.

In a tenth aspect, the light emitting section is a semiconductor laser.

According to the tenth aspect, high-speed modulation is possible.

In an eleventh aspect, the reflection section has a center on an optical axis of a light beam emitted perpendicularly from the light emitting section, and has an inclination angle $\alpha$ with a surface perpendicular to the optical axis of the light beam, and where a distance between the light emitting section and the reflection section is denoted as D and a diameter of a light emitting region of the light emitting section is denoted as $\phi$, the inclination angle $\alpha$ is set so as to satisfy a formula (1):

$$D \tan(2\alpha) > \phi/2 \quad (1).$$

According to the eleventh aspect, it is possible to reduce the connection of a light beam, among the light beam outputted from the light emitting section, which is emitted perpendicularly and reflected by the reflection section, to a light emitting region.

As described above, according to the optical space transmission module of the present invention, the transmission light is converted into the diffused light after the beam diameter thereof is increased by the reflection section, thereby forming a larger-sized secondary light source. This can reduce an upper limit of light output based on the safety standard of the laser. In addition, an amount of light returned from the reflection section to the light emitting section is reduced by diffusing the transmission light which has been reflected by the reflection section in a direction other than the direction to the light emitting section. Further, the provision of the light receiving section on the base section including the reflection section allows integration of a light receiving section and a light transmitting section, thereby making the optical space transmission module smaller in size.

These and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
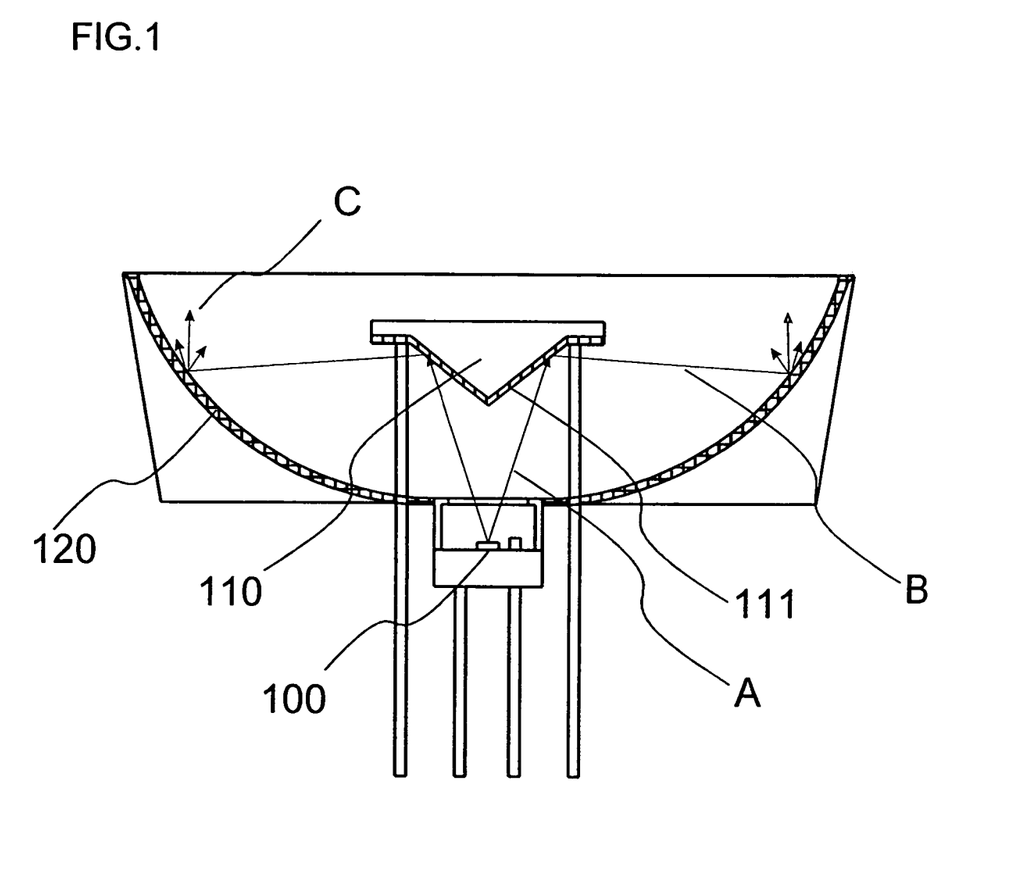
FIG. 1 is a view showing an exemplary configuration of an optical space transmission module according to a first embodiment of the present invention.

The following will describe an optical space transmission module according to the first embodiment of the present invention with reference to the attached drawings. FIG. 1 is a view showing an exemplary configuration of the optical space transmission module according to the first embodiment of the present invention. As shown in FIG. 1, the optical space transmission module comprises a light emitting section 100, a base section 110, a reflection section 111, and a reflection type diffusion section 120. The light emitting section 100 outputs a transmission light A which is modulated in accordance with a signal inputted to the light emitting section 100. The reflection section 111 is a convex mirror which is provided on a part of the base section 110 in a facing relation to the light emitting section 100. More specifically, the reflection section 111 has a cone shape. The reflection section 111 reflects the transmission light A such that a beam diameter of the transmission light A is increased. The reflection type diffusion section 120 which has a concave shape reflects and converts into a diffused light C a reflected light B reflected by the reflection section 111.

Figure 2A:
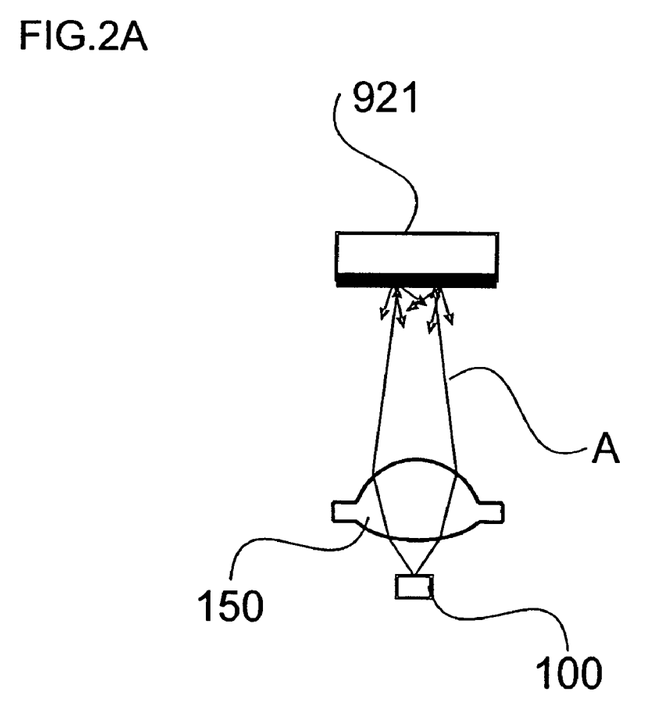
FIG. 2A is a view showing a relation between a shape of a reflection type diffusion section 921 and reflected light B in a conventional mode.
Figure 2B:
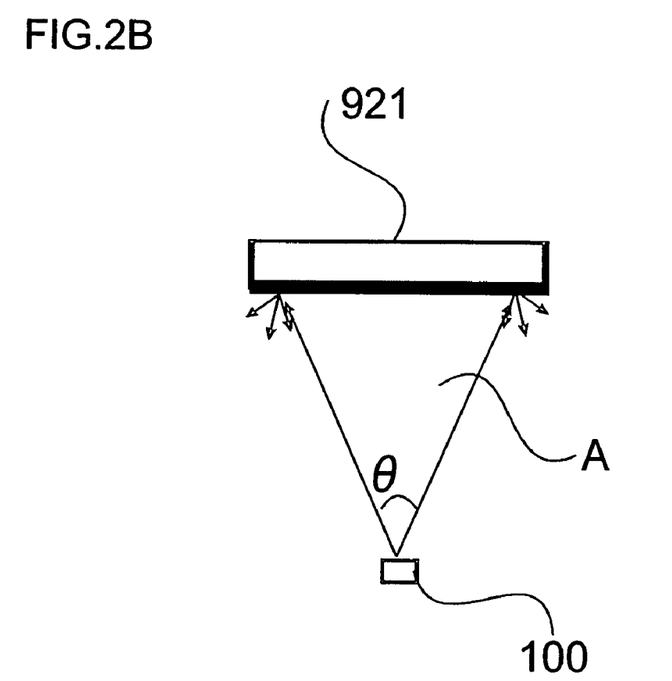
FIG. 2B is a view showing a relation between the shape of the reflection type diffusion section 921 and reflected light B in the case where a lens 150 is not provided in the conventional mode.
Figure 3A:
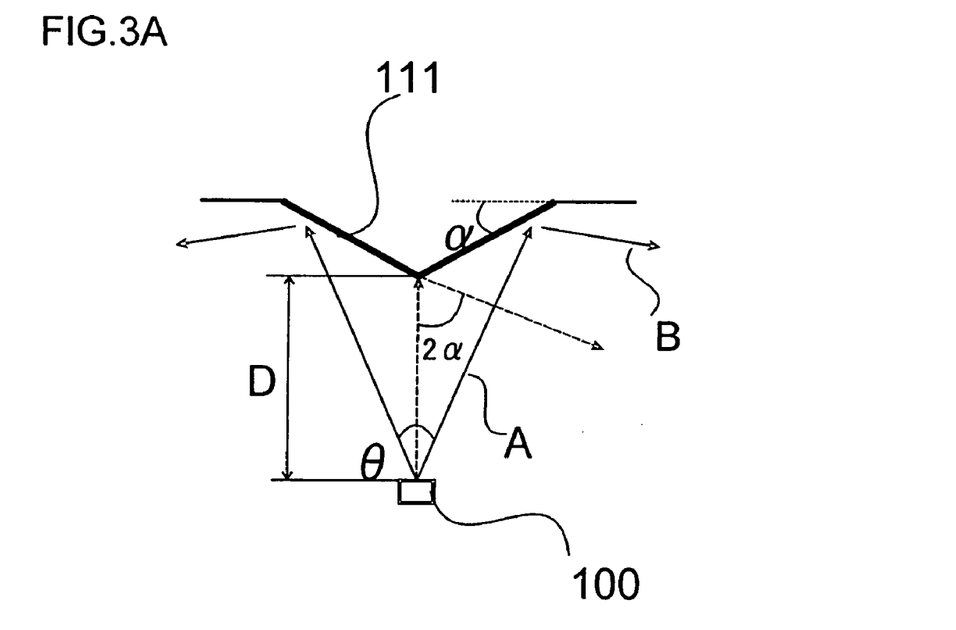
FIG. 3A is a view showing a relation between a shape of a reflection section 111 and reflected light B in the first embodiment of the present invention.
Figure 3B:
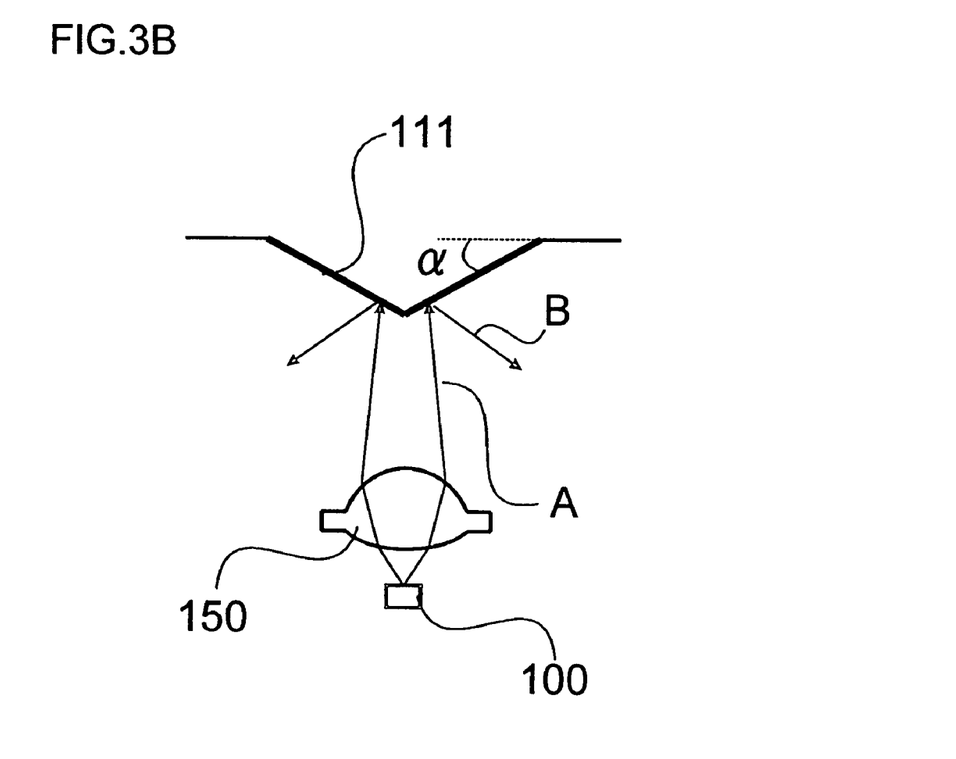
FIG. 3B is a view showing a relation between the shape of the reflection section 111 and reflected light B in the case where a lens 150 is provided in the first embodiment of the present invention.

With reference to FIGS. 2A to 3B, the following will describe a relation between the shape of the reflection section 111 of the present invention and reflected light B in comparison to a conventional mode. FIG. 2A is a view showing a relation between the shape of the reflection type diffusion section 921 and reflected light B in the conventional mode described in the Patent Document 1. FIG. 2B is a view showing a relation between the shape of the reflection type diffusion section 921 and reflected light B in the case where a lens 150 is not provided in the conventional mode for comparison to the present invention. FIG. 3A is a view showing a relation between the shape of the reflection section 111 and reflected light B in the first embodiment of the present invention. FIG. 3B is a view showing a relation between the shape of the reflection section 111 and reflected light B in the case where the lens 150 is provided in the first embodiment of the present invention for comparison to the conventional mode. In FIGS. 2A to 3B, the light emitting section 100 includes a laser light source which outputs a transmission light A with an emission angle θ. The reflection section 111 includes a mirror having a cone shape with an inclination angle α.

In the conventional mode as shown in FIG. 2A, the transmission light A outputted from the light emitting section 100 is converged by the lens 150, and diffused by the reflection type diffusion section 921 which faces the light emitting section 100. In the conventional mode as shown in FIG. 2B, the transmission light A outputted from the light emitting section 100 is directly diffused by the reflection type diffusion section 921. In these modes, the reflection type diffusion section 921 which is located in a facing relation to the light emitting section 100 diffuses the transmission light A in a wide angle range while reflecting it. Thus, there is a problem that a part of the diffused light B is returned to the light emitting section 100.

In the present invention as shown in FIG. 3A, on the other hand, from even the transmission light A (the dotted line), which is substantially perpendicularly outputted from the light emitting section 100, is obtained a reflected light B which is inclined at an angle of 2α from an incident angle. Where a distance between the light emitting section 100 and the reflection section 111 is denoted as D, the reflected light B reaches a position which is distant from the light emitting section 100 for a distance of D×tan 2α. Thus, an amount of light returned to the light emitting section 100 (hereinafter, referred to as returned light amount) can be significantly reduced as compared to the conventional mode in which a laser light is emitted directly to the reflection type diffusion section 921. In addition, a large-sized diffused light source (a secondary light source) can be formed, thereby alleviating an upper limit of light output based on the safety standard of the laser. Furthermore, even in the case where the lens 150 is provided as shown in FIG. 3B, it is possible to reduce the returned light amount to the light emitting section 100 by making the inclination angle α equal to or larger than a certain angle.

Figure 4:
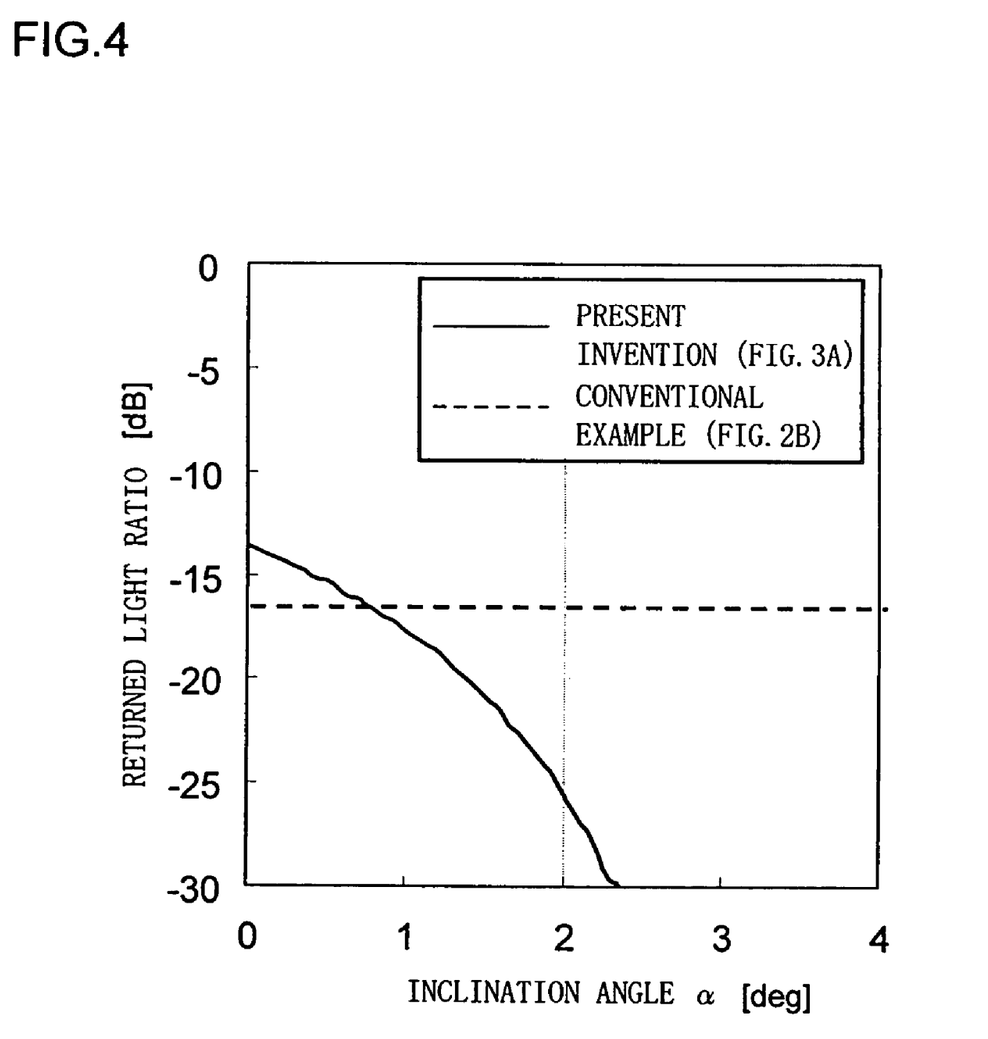
FIG. 4 shows a calculation result of returned light ratios of the present invention shown in FIG. 3A and of the conventional mode shown in FIG. 2B.

FIGS. 4 and 5 show an example of a calculation result of returned light ratios of the conventional mode and the present invention. The returned light ratio is a rate that the transmission light A outputted from the light emitting section 100 reaches a light emitting region of the light emitting section 100 after reflection and diffusion. More specifically, it is expressed as "returned light ratio=returned light amount/transmission light amount". FIG. 4 shows a calculation result of returned light ratios of the present invention shown in FIG. 3A and of the conventional mode shown in FIG. 2B. In other words, FIG. 4 shows a calculation result of returned light ratios of the present invention and the conventional mode when the lens 150 is not provided. In FIG. 4, the calculation is performed where the inclination angle α of the reflection section 111 is a variable parameter, the emission angle θ of the light emitting section 100 is 20 degrees, a size of the light emitting region of the light emitting section 100 is 80 μmφ, the distance D between the light emitting section 100 and the reflection section 111 is 0.5 mm, and the reflection type diffusion section 921 performs Lambert diffusion.

Figure 5:
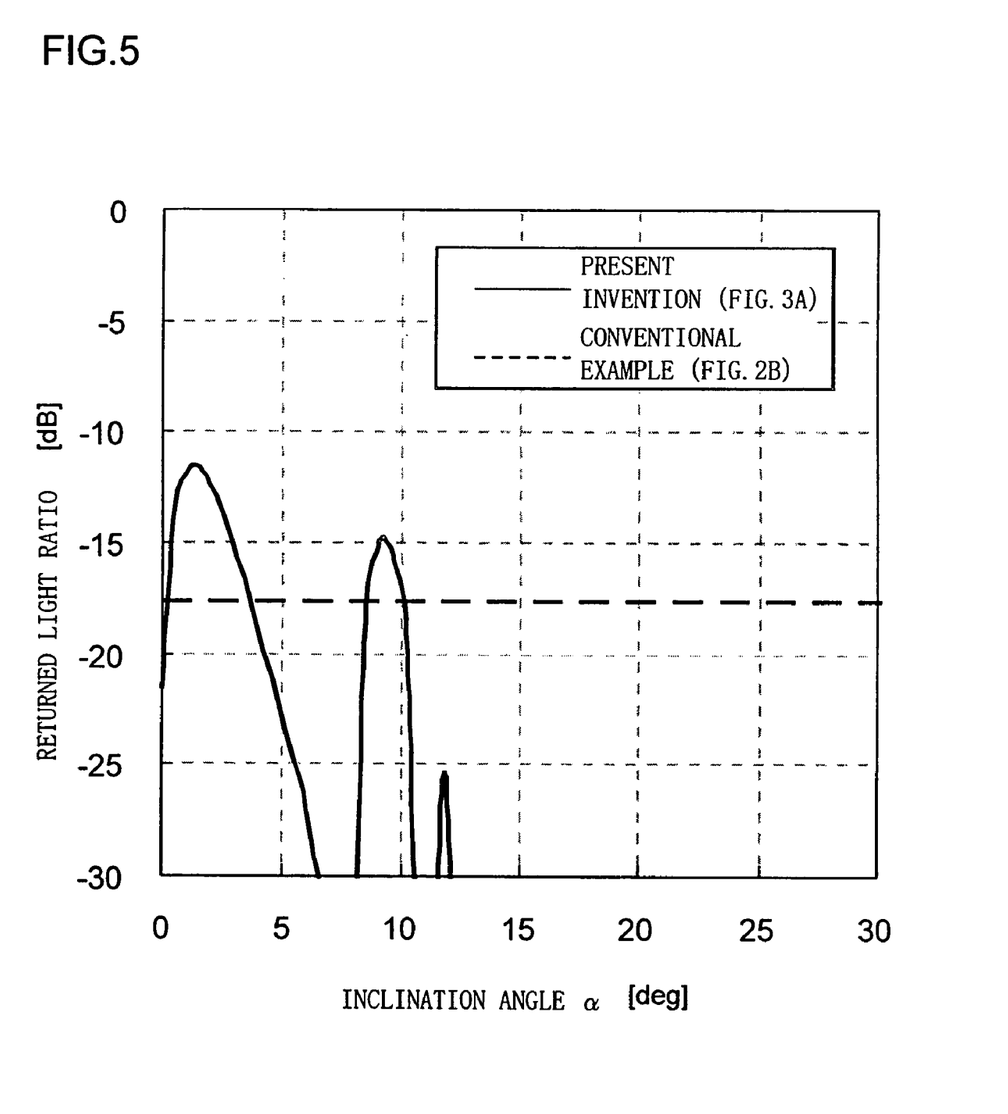
FIG. 5 shows a calculation result of returned light ratios of the present invention shown in FIG. 3B and of the conventional mode shown in FIG. 2A.

FIG. 5 shows a calculation result of returned light ratios of the present invention shown in FIG. 3B and of the conventional mode shown in FIG. 2A. In other words, FIG. 5 shows a calculation result of returned light ratios of the present invention and the conventional mode when the lens 150 is provided. In FIG. 5, the calculation is performed where the inclination angle α of the reflection section 111 is a variable parameter, the emission angle θ of the light emitting section 100 is 20 degrees, the lens 150 is a double-convex lens having a focal length of 1.6 mm, a size of the light emitting region of the light emitting section 100 is 20 μmφ, and the reflection type diffusion section 921 performs Lambert diffusion.

As seen from FIG. 4, the retuned light ratio of the conventional mode is about −17 dB, and, however, the present invention reduces the returned light ratio to −30 dB or less by setting the inclination angle α at a certain angle or more (2.4 degrees or more in this calculation condition). In addition, as seen from FIG. 5, the retuned light ratio of the conventional mode is about −17 dB, and, however, the present invention reduces the returned light ratio to −30 dB or less by setting the inclination angle α at a certain angle or more (10 degrees or more in this calculation condition).

Figure 6:
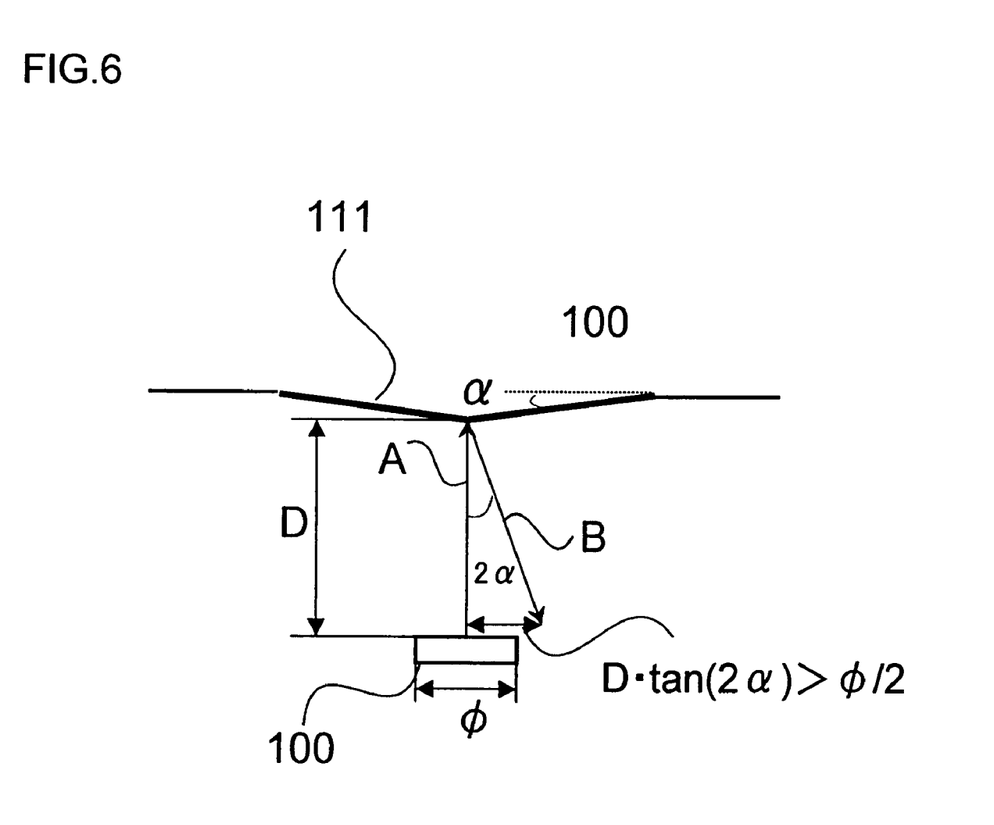
FIG. 6 is a view explaining a method of calculating an inclination angle of the reflection section 111.

The following will describe in detail a method of calculating the inclination angle α of the reflection section 111 with reference to FIG. 6. FIG. 6 shows a relation among the inclination angle α of the reflection section 111, the distance D between the light emitting section 100 and the reflection section 111, and a diameter φ of the light emitting region of the light emitting section 100. Referring to FIG. 6, a light beam, among the light beam outputted from the light emitting section 100, which is emitted perpendicularly (an emission angle 0°) generally has high intensity, and has a significant impact when returned to the light emitting region. For reducing the connection of the light beam of the emission angle 0°, which has been reflected by the reflection section 111, to the light emitting region, the inclination angle α is preferably set so as to satisfy a formula (1):

$$D \tan(2\alpha) > \phi/2 \tag{1}$$

As described above, according to the optical space transmission module of the first embodiment of the present invention, the transmission light A is converted into the diffused light C by the reflection type diffusion section 120 after the beam diameter thereof is increased by the reflection section 111, thereby forming a larger-sized secondary light source. This can reduce an upper limit of light output based on the safety standard of the laser. In addition, the returned light amount from the reflection section 111 to the light emitting section 100 is reduced by diffusing the transmission light A which has been reflected by the reflection section 111 in a direction other than the direction to the light emitting section 100.

The convex mirror of the reflection section 111 is made larger in size than the beam diameter of the transmission light A thereby to reflect all the transmission light A, and this is effective. If a condenser lens (e.g. the lens 150) is provided between the light emitting section 100 and the reflection section 111 for collimating or converging the transmission light A, the convex mirror of the reflection section 111 can be made smaller in size in comparison to the case of no condenser lens.

It is noted that although a circular cone shape is shown as an example of the convex mirror in the embodiment, the shape of the convex mirror is not limited thereto. Alternatively, the convex mirror may have a spherical shape or any other non-spherical shape as long as it reduces the reflected light returned to the light emitting section 100.

Second Embodiment

Figure 7:
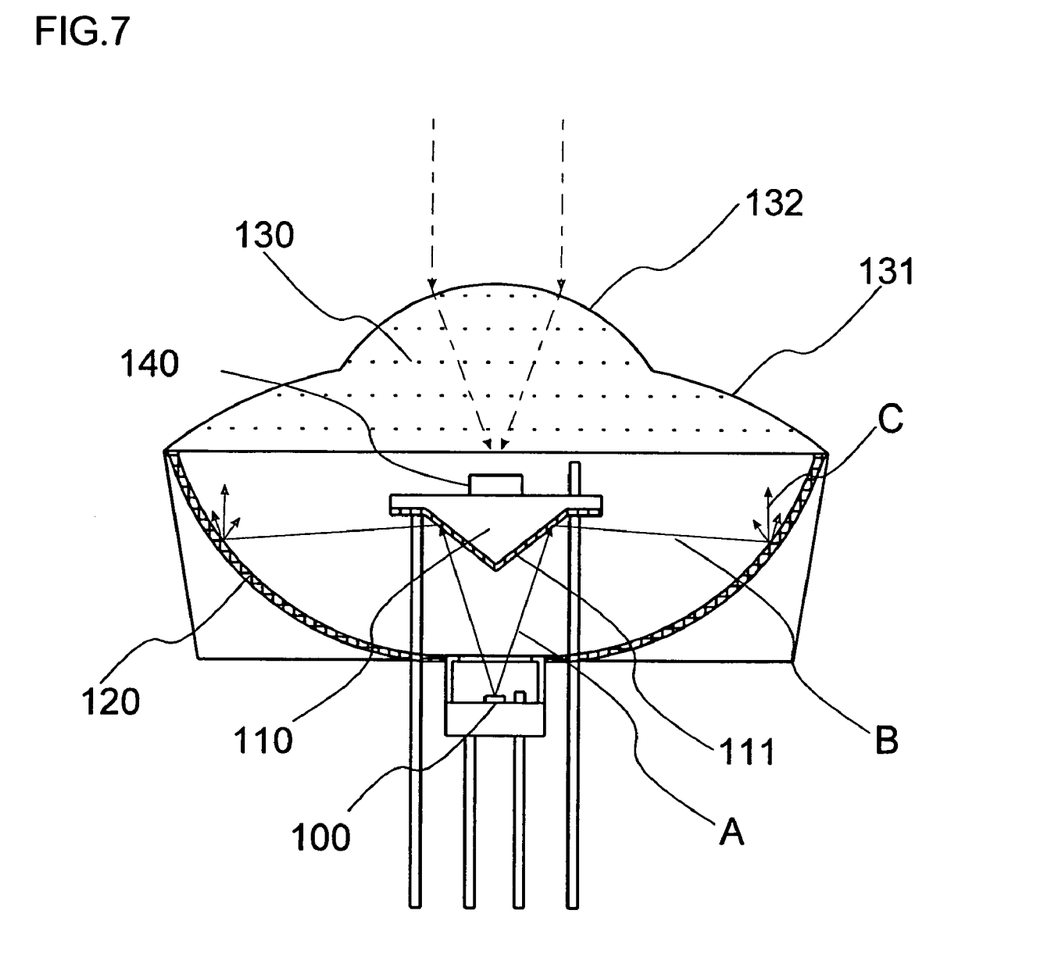
FIG. 7 is a view showing an exemplary configuration of an optical space transmission module according to a second embodiment of the present invention.

The following will describe an optical space transmission module according to a second embodiment of the present invention with reference to the attached drawing. FIG. 7 is a view showing an exemplary configuration of the optical space transmission module according to the second embodiment of the present invention. Referring to FIG. 7, the optical space transmission module according to the second embodiment differs from that according to the first embodiment in that a lens section 130 and a light receiving section 140 are added. The same components as those in the above-mentioned first embodiment are designated by the same reference numerals, and the description thereof will be omitted.

As shown in FIG. 7, the lens section 130 includes a plurality of lens regions. More specifically, the lens section 130 includes a first lens region 131 which distributes a diffused light, and a second lens region 132 which converges a light beam into the light receiving section 140. The lens section 130 is arranged so as to cover the reflection type diffusion section 120. The light receiving section 140 is arranged on a surface of the base section 110 different from the reflection section 111.

The reflection section 111 provided on the base section 110 is arranged in a facing relation to the light emitting section 100, thus a space being formed on the back side of the reflection section 111. The light receiving section 140 is provided in the generally-unused space on the back side of the reflection section 111, thereby allowing formation of a module into which a light receiving section and a light emitting section are integrated. In addition, the light receiving section 140 is arranged such that the reflection section 111 is located between the light emitting section 100 and the light receiving section 140, and these three components are substantially aligned along a straight line, thereby preventing the transmission light A outputted from the light emitting section 100 from being connected to the light receiving section 140.

In the lens section 130 including the first lens region 131 and the second lens region 132, an optimal shape can be designed for each region, thereby improving characteristics of distribution of the diffused light and characteristics of convergence into the light receiving section 140.

As described above, according to the optical space transmission module of the second embodiment of the present invention, in addition to the advantageous effects described in the first embodiment, the provision of the light receiving section 140 on the surface of the base section 110 different from the reflection section 111 allows for the formation of a module into which a light emitting section and a light receiving section are integrated. This reduces an overall size of a receiver-transmitter. The lens section 130, which includes the first lens region 131 for distributing the diffused light and the second lens region 132 for converging the light beam into the light receiving section 140, can improve characteristics of distribution of the diffused light and characteristics of convergence into the light receiving section 140.

Third Embodiment

Figure 8:
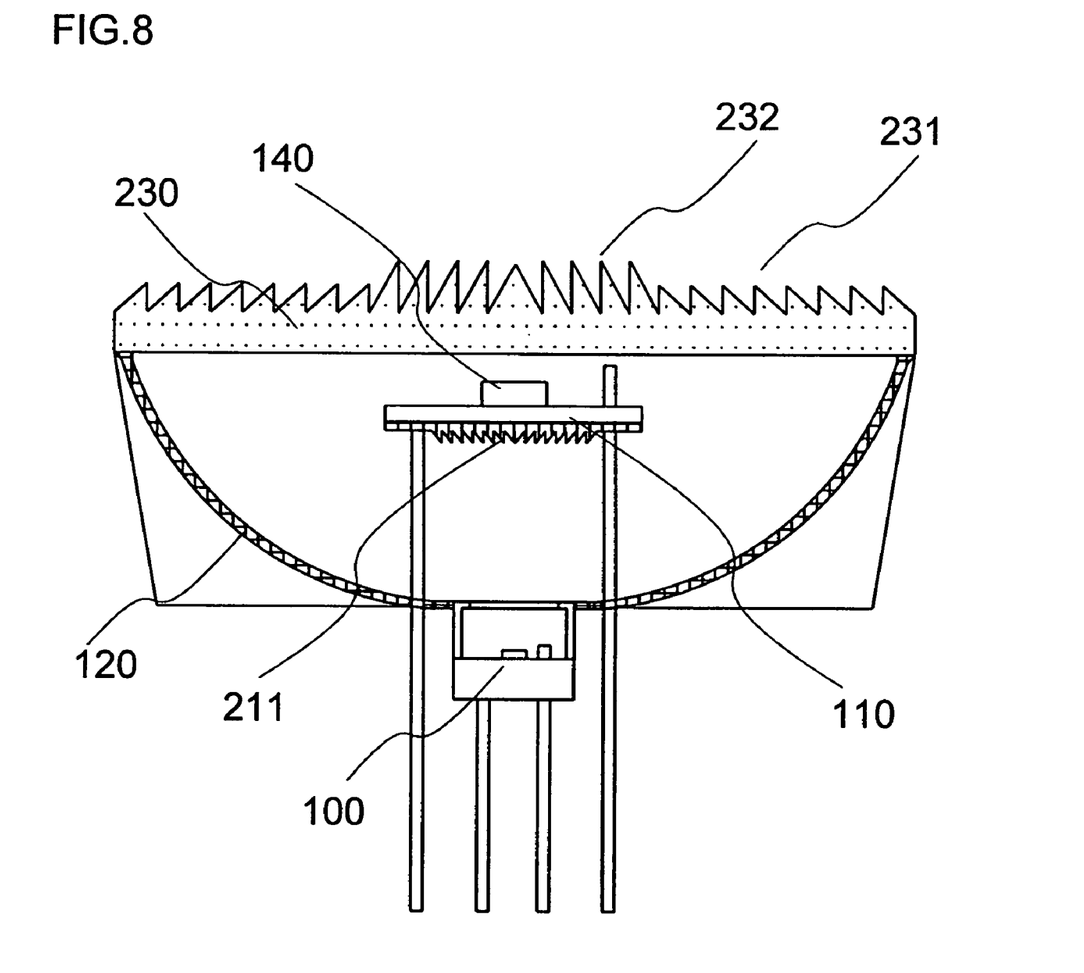
FIG. 8 is a view showing an exemplary configuration of an optical space transmission module according to a third embodiment of the present invention.

The following will describe an optical space transmission module according to a third embodiment of the present invention with reference to the attached drawing. FIG. 8 is a view showing an exemplary configuration of the optical space transmission module according to the third embodiment of the present invention. As shown in FIG. 8, the optical space transmission module of the third embodiment differs from that of the second embodiment in that a reflection section 211 and a lens section 230 are different in structure from those of the second embodiment. The same components as those in the above-mentioned second embodiment are designated by the same reference numerals, and the description thereof will be omitted.

As shown in FIG. 8, the reflection section 211 is made up of a Fresnel mirror which is provided in a facing relation to the light emitting section 100 and has the same function as the convex mirror. The lens section 230 is made up of a Fresnel lens having a plurality of lens regions. More specifically, the lens section 230 includes a first Fresnel lens region 231 which distributes a diffused light, and a second Fresnel lens region 232 which converges a light beam into the light receiving section 140.

As described above, according to the optical space transmission module of the third embodiment of the present invention, in addition to the same advantageous effects as the second embodiment, the lens section 230 is made lighter in weight and thinner in thickness and the reflection section 211 is made lighter in weight because the lens section 230 is made up of the Fresnel lens and the reflection section 211 is made up of the Fresnel mirror. As the result, the optical space transmission module is made lighter in weight and thinner in thickness.

Fourth Embodiment

Figure 9:
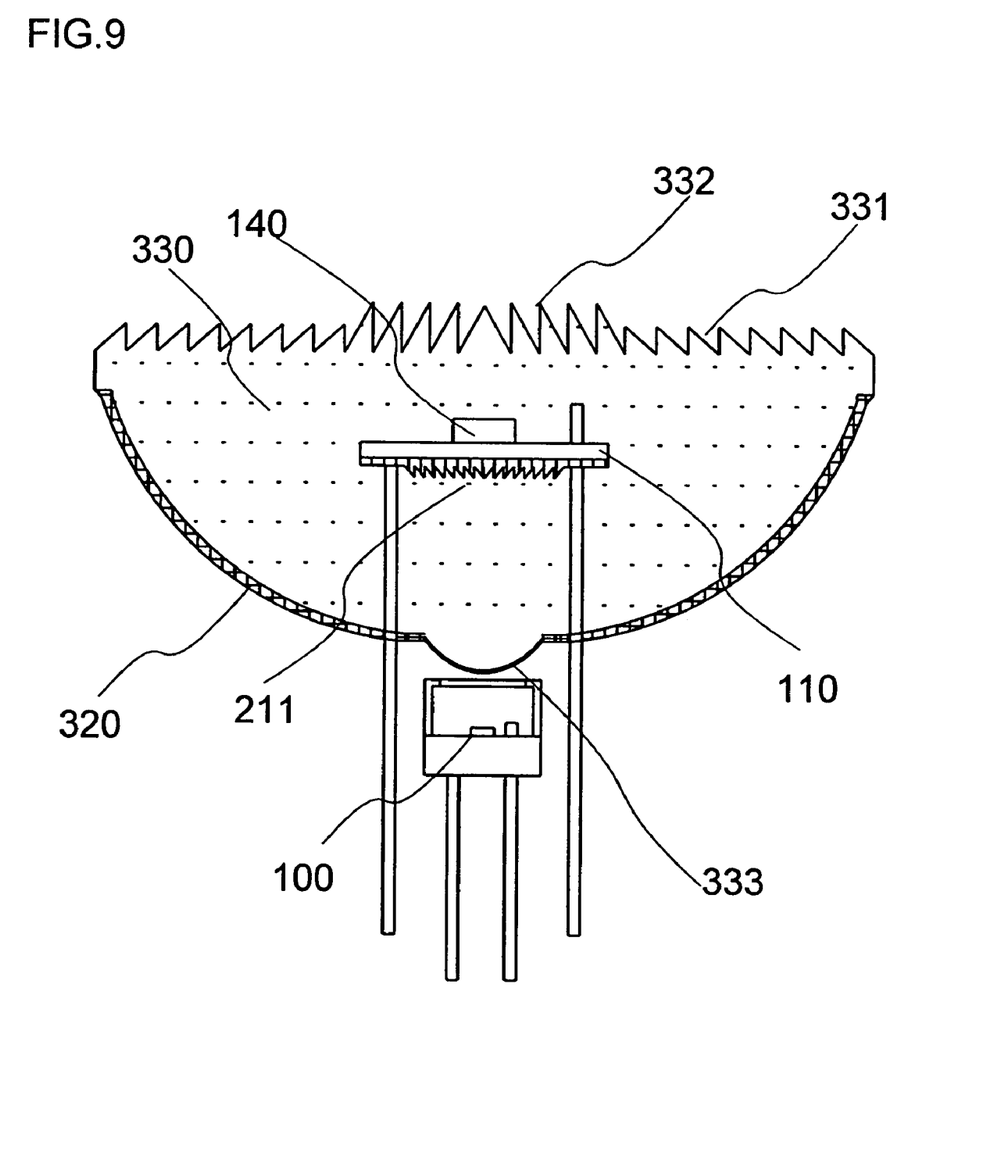
FIG. 9 is a view showing an exemplary configuration of an optical space transmission module according to a fourth embodiment of the present invention.

The following will describe an optical space transmission module according to a fourth embodiment of the present invention with reference to the attached drawing. FIG. 9 is a view showing an exemplary configuration of the optical space transmission module according to the fourth embodiment of the present invention. As shown in FIG. 9, the optical space transmission module of the fourth embodiment differs from that of the third embodiment in that a reflection type diffusion section 320 and a lens section 330 are different in structure from those of the third embodiment. The same components as those in the above-mentioned third embodiment are designated by the same reference numerals, and the description thereof will be omitted.

As shown in FIG. 9, the lens section 330 is made up of a plastic mold which accommodate therein the light receiving section 140 and the base section 110, and includes on its surface a plurality of lens regions. More specifically, the lens section 330 includes a first Fresnel lens region 331 which distributes a diffused light, and a second Fresnel lens region 332 which converges a light beam into the light receiving section 140. The lens section 330 is formed with a convex opening section 333. The reflection type diffusion section 320 is formed on the curved side surface of the lens section 330. The transmission light outputted from the light emitting section 100 enters the lens section 330 through the opening section 333, and reaches the reflection section 211.

Shapes for the first Fresnel lens region 331, the second Fresnel lens region 332, and the opening section 333 are formed in a mold for forming the lens section 330 in advance, so that the first Fresnel lens region 331, the second Fresnel lens region 332, and the opening section 333 are created concurrently with formation of the lens section 330. The reflection type diffusion section 320 is created by applying white coating to the curved side surface of the lens section 330 which has been dealt with sand surface processing.

Since the opening section 333 is convex-shaped, the opening section 333 has the effect of a condenser lens so that a beam diameter of the transmission light emitted to the reflection section 211 is reduced. Thus, a processing area of the reflection section 211 becomes small, with the result that a processing cost and a processing time for the reflection section 211 are reduced.

As described above, according to the optical space transmission module of the fourth embodiment of the present invention, components such as the first Fresnel lens region 331, the second Fresnel lens region 332, the opening section 333, and the like are created concurrently with the formation of the lens section 330. Thus, the number of parts and the number of man-hours are reduced in manufacturing the optical space transmission module, with the result that a cost of the module is reduced.

It is noted that the side surface of the lens section 330 is not limited to have a curved shape and may have an inverted circular cone shape. The lens section 330 is not limited to a Fresnel lens, and may be a convex lens. The opening section 333 is not limited to have a convex shape, and may be a Fresnel lens.

The optical space transmission module according to the present invention achieves safety of eye from a laser light source and integration of a light receiving module and a light emitting module by a simple structure, and is useful for achieving safety and size reduction of an optical space transmission system.

While the invention has been described in detail, the foregoing description is in all aspects illustrative and not restrictive. It is understood that numerous other modifications and variations can be devised without departing from the scope of the invention.

What is claimed is:

1. An optical space transmission module for transmitting an optical signal through an external space as a medium, the optical space transmission module comprising:
    a light emitting section operable to output a transmission light;
    a base section including a reflection section operable to reflect the transmission light; and
    a reflection type diffusion section operable to reflect and convert the reflected transmission light, which has been reflected by the reflection section, into a diffused light, wherein
    the reflection section has a function to increase a beam diameter of the transmission light after reflection,
    the reflection section has a center on an optical axis of a light beam emitted perpendicularly from the light emitting section, and has an inclination angle $\alpha$ with a surface perpendicular to the optical axis of the light beam, and
    where a distance between the light emitting section and the reflection section is denoted as D and a diameter of a light emitting region of the light emitting section is denoted as $\phi$, the inclination angle $\alpha$ is set so as to satisfy a formula (1):

$$D \tan(2\alpha) > \phi/2 \qquad (1).$$

2. The optical space transmission module according to claim 1, wherein the reflection section is a convex mirror.

3. The optical space transmission module according to claim 1, wherein the reflection section includes a Fresnel mirror.

4. The optical space transmission module according to claim 1, wherein the light emitting section is a semiconductor laser.

5. The optical space transmission module according to claim 1, wherein the reflection type diffusion section has a concave shape.

6. The optical space transmission module according to claim 1, further comprising a light receiving section operable to receive an optical signal, wherein
    the light receiving section is provided on a surface of the base section different from the reflection section.

7. The optical space transmission module according to claim 6, further comprising a lens section which is provided so as to cover the reflection type diffusion section.

8. The optical space transmission module according to claim 6, wherein
    the reflection section is located between the light emitting section and the light receiving section, and
    the reflection section, the light emitting section, and the light receiving section are aligned substantially along a straight line.

9. An optical space transmission module for transmitting an optical signal through an external space as a medium, the optical space transmission module comprising:
    a light emitting section operable to output a transmission light;
    a base section including a reflection section operable to reflect the transmission light;
    a reflection type diffusion section operable to reflect and convert the reflected transmission light, which has been reflected by the reflection section, into a diffused light;
    a light receiving section operable to receive an optical signal; and
    a lens section which is provided so as to cover the reflection type diffusion section, wherein
    the reflection section has a function to increase a beam diameter of the transmission light after reflection,
    the light receiving section is provided on a surface of the base section different from the reflection section,
    the lens section includes a plurality of lens regions, and
    the plurality of lens regions includes at least a first lens region operable to distribute the diffused light and a second lens region operable to converge the optical signal into the light receiving section.

10. An optical space transmission module for transmitting an optical signal through an external space as a medium, the optical space transmission module comprising:
    a light emitting section operable to output a transmission light;
    a base section including a reflection section operable to reflect the transmission light;
    a reflection type diffusion section operable to reflect and convert the reflected transmission light, which has been reflected by the reflection section, into a diffused light;
    a light receiving section operable to receive an optical signal; and
    a lens section which is provided so as to cover the reflection type diffusion section, wherein
    the reflection section has a function to increase a beam diameter of the transmission light after reflection,
    the light receiving section is provided on a surface of the base section different from the reflection section, and
    the lens section includes a Fresnel lens.

* * * * *